United States Patent
Pham et al.

(10) Patent No.: US 10,044,375 B2
(45) Date of Patent: Aug. 7, 2018

(54) MULTIBAND TRANSMITTER CIRCUIT WITH INTEGRATED CIRCULATORS AND FILTERS

(71) Applicant: Telefonaktiebolaget LM Ericsson (publ), Stockholm (SE)

(72) Inventors: Bi Pham, Ottawa (CA); Buu Dam, Ottawa (CA); Chunyun Jian, Ottawa (CA); Somsack Sychaleun, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/547,296

(22) PCT Filed: Jan. 30, 2015

(86) PCT No.: PCT/IB2015/050735
§ 371 (c)(1),
(2) Date: Jul. 28, 2017

(87) PCT Pub. No.: WO2016/120672
PCT Pub. Date: Aug. 4, 2016

(65) Prior Publication Data
US 2018/0034486 A1 Feb. 1, 2018

(51) Int. Cl.
*H04M 1/00* (2006.01)
*H04B 1/00* (2006.01)
*H04B 1/04* (2006.01)

(52) U.S. Cl.
CPC ......... *H04B 1/0057* (2013.01); *H04B 1/0458* (2013.01); *H04B 2001/0433* (2013.01)

(58) Field of Classification Search
CPC ...... H04B 1/0057; H04B 1/005; H04B 1/0458
(Continued)

(56) References Cited

U.S. PATENT DOCUMENTS 6,643,522 B1 * 11/2003 Young .................. H04B 1/005
  455/41.2
6,766,178 B1 * 7/2004 Damgaard ............... H03L 7/23
  455/216

(Continued)

FOREIGN PATENT DOCUMENTS

CN  102948081 A  2/2013
JP  2004200853 A  7/2004

*Primary Examiner* — Sonny Trinh
(74) *Attorney, Agent, or Firm* — Sage Patent Group (57) ABSTRACT

A multi-band transmitter circuit may include a multi-port network configured to divide an input multi-band signal comprising signal components at each of a plurality of frequency bands into a plurality of output multi-band signals. The multi-band transmitter circuit may also include a plurality of band-specific circulator paths. Each band-specific circulator path includes a circulator configured to receive the respective output multi-band signal and operate at a respective one of the frequency bands to provide a respective band-specific signal. The multi-band transmitter circuit further includes a filter circuit that includes a plurality of band-specific filter elements. Each band-specific filter element is coupled to a corresponding circulator and configured to receive the respective band-specific signal and operate at the same frequency band as the corresponding circulator to provide a filtered band-specific signal for transmission.

20 Claims, 7 Drawing Sheets

(58) Field of Classification Search
USPC .................................. 455/552.1, 213, 78
See application file for complete search history.

(56) References Cited

U.S. PATENT DOCUMENTS

| | | | |
|---|---|---|---|
| 7,656,228 B2* | 2/2010 | Fukuda | H03F 1/0288 |
| | | | 330/126 |
| 8,803,635 B1* | 8/2014 | Ashworth | H01P 1/213 |
| | | | 333/126 |
| 9,240,811 B2* | 1/2016 | Norholm | H04B 1/56 |
| 9,374,056 B2* | 6/2016 | Bagger | H04B 1/0057 |
| 9,622,181 B2* | 4/2017 | Talty | H04B 1/3822 |
| 2008/0129410 A1 | 6/2008 | Fukuda et al. | |
| 2013/0309985 A1* | 11/2013 | Saito | H04B 1/006 |
| | | | 455/114.3 |

* cited by examiner

MULTIBAND TRANSMITTER CIRCUIT WITH INTEGRATED CIRCULATORS AND FILTERS

TECHNICAL FIELD

This disclosure relates to radio-frequency transmitter circuits.

BACKGROUND

Wireless operators of communication networks often have radio cell site solutions that include many different frequency bands. This requires multiple radio base station units on the same cell site to support each frequency band. There is an increasing demand for a single radio base station that can operate in more than one frequency band in order to reduce equipment and operational costs. In addition, future standards, such as Long Term Evolution-Advanced (LTE-A), will enable users to simultaneously transmit and receive across more than one band to achieve a faster data rate. Therefore, having a single radio unit with multiband capability can be very advantageous. However, due to the narrowband nature of conventional transmitter architecture and radio-frequency (RF) components, it is recognized herein that conventional transmitters are not sufficient for optimal multi-band operations.

Figure 1:
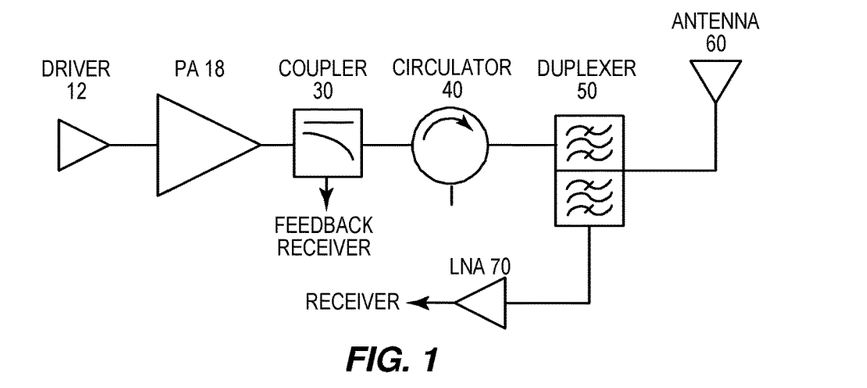
FIG. 1 is a diagram of a conventional communication device having a single-band transmitter circuit.

In a single-band base station, a typical transmitter subsystem block could be shown by FIG. 1. The conventional transmitter includes a driver 12 to amplify a low power RF signal to an adequate level and a narrow band power amplifier 18 to further amplify the RF signal. The conventional transmitter may also include a coupler 30 that samples the RF signal from the power amplifier 18 and sends it back to a feedback receiver for power control and digital predistortion (DPD) linearization. A circulator 40 protects the power amplifier from any reflected signals by providing isolation. A duplexer 50 additionally filters out any out of band emissions and enables the receiver (through low noise amplifier 70) and the transmitter to share the same antenna 60 by providing isolation between the two paths.

Many of the components, such as the power amplifier 18 and circulator 40, are inherently relatively narrowband, e.g., having a fractional bandwidth less than about 20%. Some studies have involved wide-band, highly efficient, power amplifiers. A multi-band power amplifier that operates in two or more bands is also possible, but not necessarily for broadband use, i.e., with fractional bandwidths greater than about 20%. However, it is recognized herein that constructing a circulator for broadband use can be difficult due to the inherent nature of the resonance of the magnetic material in the circulator or isolator.

Figure 2:
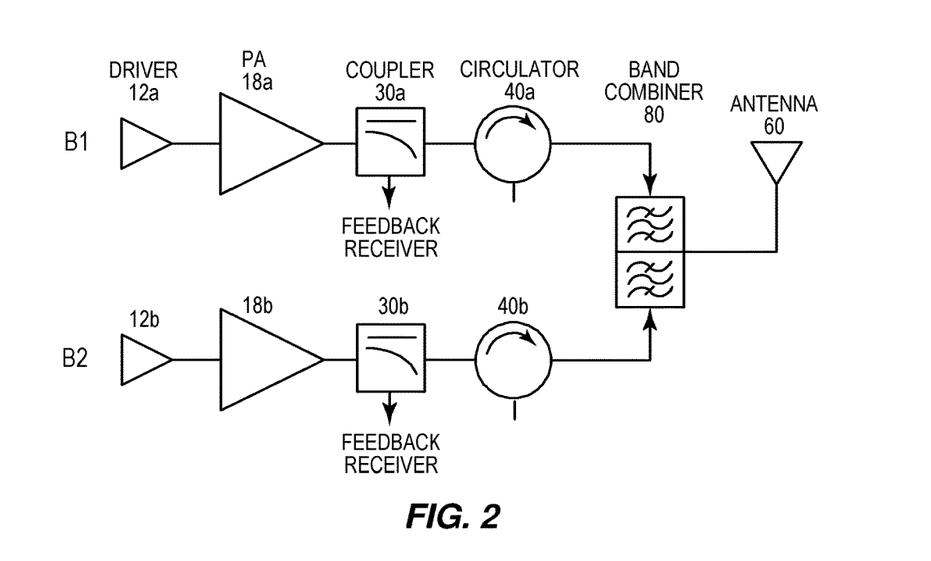
FIGS. 2-3 are diagrams of conventional communication devices having a multi-band transmitter circuit.

There have been several proposals for multiband transmitter architectures. The first, shown as a dual band transmitter in FIG. 2, has two independent transmitter paths—one for each frequency band. The transmitter has drivers 12a, 12b, narrowband power amplifiers 18a, 18b, couplers 30a, 30b and circulators 40a, 40b. The signals are then combined at the band combiner 80 (duplexer) for transmission on antenna 60. An advantage of this architecture is that each transmit path is optimized specifically for one band; performance for multiband is as good as a single band. Any band combinations at any frequencies are possible. The disadvantages include the large size required for two transmit paths, including two power amplification paths. This is a challenge when designing for a small radio that can be mounted on the tower top. Especially for radio designs that support Multiple-In-Multiple-Out (MIMO) techniques, this will become expensive and bulky.

Figure 3:
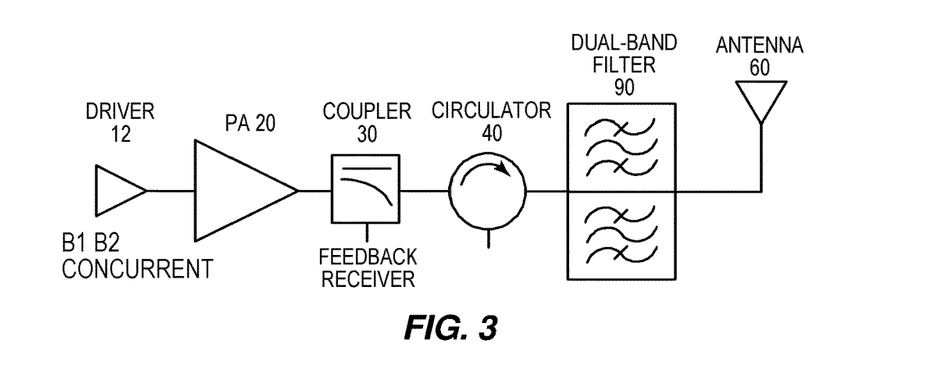

A second multiband transmitter architecture option, as shown in FIG. 3, uses one transmit path that is capable of operating in more than one band, using a wideband power amplifier 20 and a wideband circulator 40. The power amplifier 20 generally has a fractional bandwidth that is wide enough to operate in more than one band. Typically the power amplifier 20 can operate within neighboring bands occupying approximately 20% fractional bandwidth or more. The circulator 40 will also need to be wideband to provide good return loss and isolation protection to the power amplifier 20. Dual-band filter 90 filters the signal. This architecture allows for a smaller size radio since only one transmission path is required. However, a disadvantage of this broadband single transmit architecture is the RF bandwidth limitation of the power amplifier 20 and especially the circulator 40. The power amplifier can be constructed for broader bandwidth or designed for two or more bands. However, the circulator will be the main limitation, as it is generally limited to about 20% fractional bandwidth. More than 20% bandwidth is possible, but this requires sacrifices in performance, including poor return loss to the power amplifier. Basically, the isolation in such a circulator is poor and the large magnetic disks occupy a large area of printed circuit board (PCB) space. Further, multi-band operation for scenarios where the bands have a frequency separation of more than one frequency octave is not known to be possible at all.

It is recognized herein that existing circulators are insufficient for many current and future multiband purposes. A wideband circulator is limited by the magnetic material. Conventional circulators do not have a wide enough bandwidth to cover dual bands that are more than 20% fractional bandwidth apart. Complexities in design of broadband circulators may require expensive magnetic materials and novel design techniques. Furthermore, broader band circulators require performance sacrifices such as poor isolation, mismatch and insertion loss, which result in poor unpredictable power amplifier performance and higher power consumption.

It is further recognized that there may be poor performance due to aliasing within the transmit observatory receivers due to the harmonics of one or more bands that are further spaced apart in frequency.

SUMMARY

Embodiments of the present invention mitigate the limitations of circulator bandwidth to enable true multiband transmitter capability. This allows various bands to be combined in a single transmitter for multiband concurrent transmission rather than only neighboring bands via a wideband circulator implementation. Such a solution enables use of wideband or multiband power amplification. The solution also adds redundancy with separate band circulators, so that in case one fails, the transmitter can still operate on the other band.

According to some embodiments, a multi-band transmitter circuit includes a multi-port network configured to divide an input multi-band signal comprising signal components at each of a plurality of frequency bands into a plurality of output multi-band signals. The multi-band transmitter circuit also includes a plurality of band-specific circulator paths, each band-specific circulator path comprising a circulator configured to receive the respective output multi-band signal and operate at a respective one of the frequency bands to provide a respective band-specific signal. The multi-band transmitter circuit further includes a filter circuit comprising a plurality of band-specific filter elements, each band-specific filter element being coupled to a corresponding circulator and configured to receive the respective band-specific signal and operate at the same frequency band as the corresponding circulator to provide a filtered band-specific signal for transmission.

According to some embodiments, a communication device includes a multi-band transmitter circuit. The multi-band transmitter circuit includes a power amplification circuit configured to provide an amplified multi-band signal and a multi-port matching network having only one input coupled to the power amplification circuit and a plurality of outputs, each output coupled to a separate circulator path. The multi-port matching network is configured to divide and/or distribute the amplified multi-band signal into the separate circulator paths. The multi-band circuit includes a plurality of circulators, each circulator coupled to a respective output of the multi-port matching network in a respective circulator path and configured to isolate a frequency band-specific signal from the amplified multi-band signal distributed to the circulator, wherein the multi-port matching network is configured to impedance match the distributed multi-band signals to the corresponding circulators. The multi-band circuit includes a filter circuit configured to filter and combine the frequency band-specific signals into a combined signal for transmission.

According to some embodiments, a method, in a communication device, of transmitting a multi-band signal includes dividing an input multi-band signal comprising signal components at each of a plurality of frequency bands into a plurality of output multi-band signals. The method also includes, in each of a plurality of band-specific circulator paths, receiving a respective output multi-band signal, isolating a frequency band-specific signal from the output multi-band signal. The method further includes filtering each frequency band-specific signal for transmission.

Of course, the present invention is not limited to the above features and advantages. Indeed, those skilled in the art will recognize additional features and advantages upon reading the following detailed description, and upon viewing the accompanying drawings.

DETAILED DESCRIPTION

Embodiments of the present invention provide a dual band architecture that overcomes the problems of conventional designs for wideband or multi-band transmitters. For example, a signal is divided into separate paths for each frequency band and the circulators are integrated into the filtering circuit. One advantage of having the circulator tightly coupled to the filter is that the impedance response provided to the filter is more predictable, allowing for improved overall filter/circulator performance.

Figure 4:
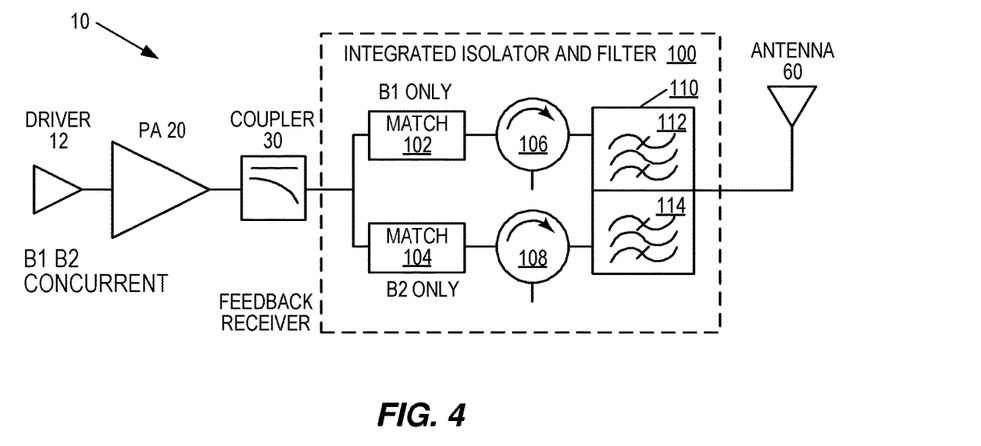
FIGS. 4-5 are diagrams of a multi-band transmitter circuit, according to some embodiments.

In an example, as shown in the frequency division duplex, or FDD, embodiment of FIG. 4, a multi-band transmitter circuit 10 includes an integrated isolator and filter 100, which may be a modified duplexer. The integrated isolator and filter 100 receives a signal amplified by wideband power amplifier 20. The integrated isolator and filter 100 includes a dividing node, such as a T-junction, and impedance-matching networks 102, 104 to prepare the signal for frequency isolation by band specific circulators 106, 108. Each circulator 106, 108 will have been implemented to provide full power reflection from the other band. In this FDD scenario, circulators 106, 108 operate as isolators, having a port terminated to a system characteristic impedance, normally of 50 ohm. The circulators 106, 108 are followed by a filter 110 and a combined node or T-junction to a single antenna 60. Filter 110 has separate band-specific components 112, 114 for filtering each band-specific signal of each path in preparation for transmission. The combining and dividing nodes are conceptual and do not necessarily have to be implemented as a T-junction.

Band rejection of the circulators 106, 108 is further described. Assume two radio frequency bands, B1 and B2, are transmitted to the integrated circulator and filter 100 from power amplifier 20. Band B1 will pass through the matching network 102 and the top circulator 106 while matching network 102 and circulator 106 reject the signal from band B2 Similarly, the matching network 104 and the bottom circulator 108 rejects B1 and lets the signal from B2 pass. The passband and rejection bands are achieved using the combination of the impedance-matching networks 102 and 104 with the band-specific designs of circulators 106 and 108, as well as individual band filter/duplexer 112 and 114.

Figure 5:
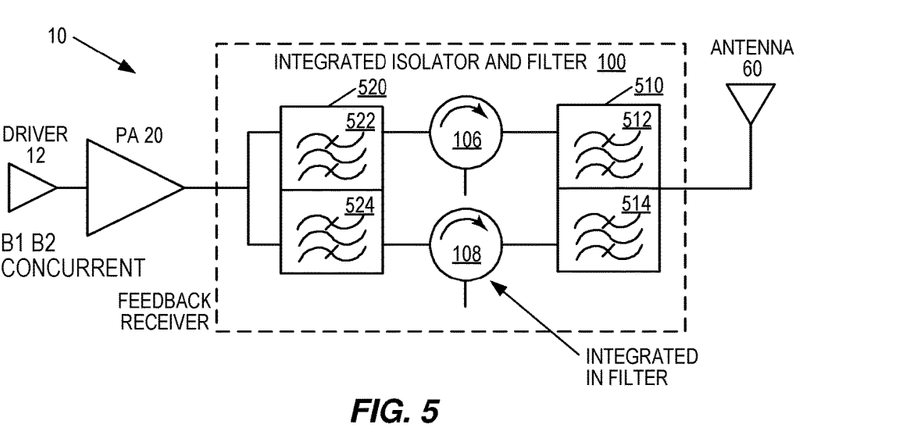

As shown in FIG. 5, the filtering functionality of integrated circulator and filter 100 can be separated into two filters 510, 520, with the circulators 106, 108 being placed between the two filters 510, 520. Each element 522, 524 of a prefilter 520 is integrated with a corresponding circulator 106, 108, which is integrated with a corresponding element 512, 514 of filter 510. One advantage of this integration is that no separate matching network is required, because the matching of the integrated isolator and filter 100 to the PA 20 can be built into the design of prefilter 520 itself. This reduces complexity. Another advantage is the ability to use mixed filter technology (e.g. filters 510 and 520 can be different), which provides design flexibility. Using the same filter technology provides more predictability in the design process.

Note that while duplexers and dual paths are described in certain embodiments, the present invention is not limited to only two paths and duplex filters; multiple other paths may be used to divide or distribute signals that are each isolated and filtered at respective frequency bands in preparation for transmission on antenna 60. While only a single antenna 60 is shown, it will be appreciated that the integrated isolator and filter 100 shown in FIGS. 4 and 5 could be connected to multiple antennas, or to an antenna array, in various embodiments.

Figure 6:
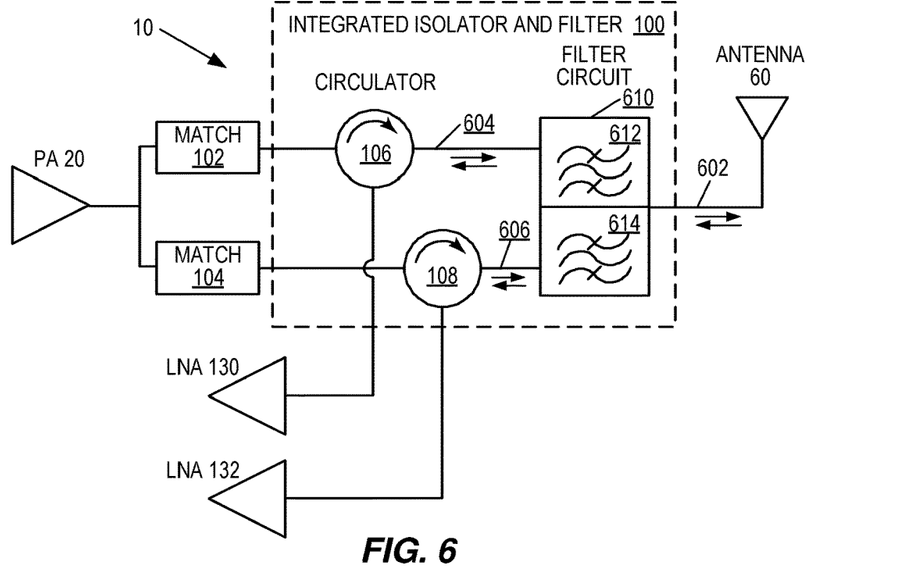
FIGS. 6-7 are diagrams of a multi-band transmitter circuit configured for signal reception, according to some embodiments.
Figure 7:
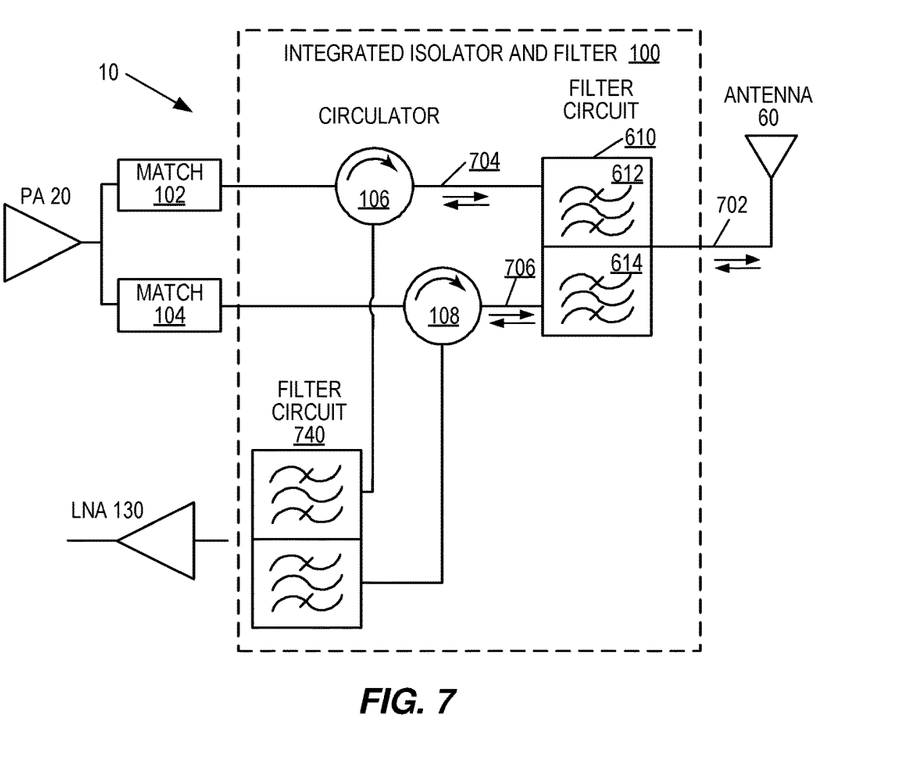

While FIGS. 4-5 illustrate implementations in FDD, FIGS. 6 and 7 illustrate implementations of a multi-band transmitter circuit 10 for time-division duplex, or TDD, operation. The filter 610 acts as a duplexer for the transmit and receive paths. The received signals on lines 604, 606 are taken from the third ports of the circulators 106, 108 to be passed through low noise amplifiers (LNA) 130, 132.

For example, the multi-band transmitter circuit 10 of FIG. 6 includes a power amplifier 20 that amplifies a signal that is divided or distributed to circulators 106, 108. Matching elements 102 and 104 impedance match the signals to the corresponding circulators 106, 108. The isolated band-specific signals from the circulators 106, 108 are filtered by filter 610 and combined for transmission on antenna 60. Filter 610 is also designed to receive a signal 602 from the antenna 60 and pass the signal through respective filter elements 612, 614 to the circulators 106, 108. The signals output from the third ports of the circulators 106, 108 are passed on to the receiver following amplification by LNAs 130, 132.

FIG. 7 is shown to operate similarly, except that filter 740 is added to further filter and combine the respective signals received from circulators 106, 108. Filter 610 provides a signal from line 702 to lines 704 and 706. In some cases, circulators 106, 108 are tightly integrated with filter 610. In other cases, circulators 106, 108 are tightly integrated with filter 740. Also, circulators 106, 108 may be tightly integrated with respective elements of both the filter 740 and the filter 610.

Integration may include direct coupling between an isolator or circulator and a corresponding filter element. Integration may include design of a filter circuit and/or corresponding isolator or circulator for impedance matching. That is, the integrated elements may be impedance matched, without matching to an intermediate nominal reference impedance (e.g., 50 ohms). With tightly integrated components, there is a minimal amount of integration hardware, e.g., matching elements, between the two components. This also improves broadband performance.

Figure 8:
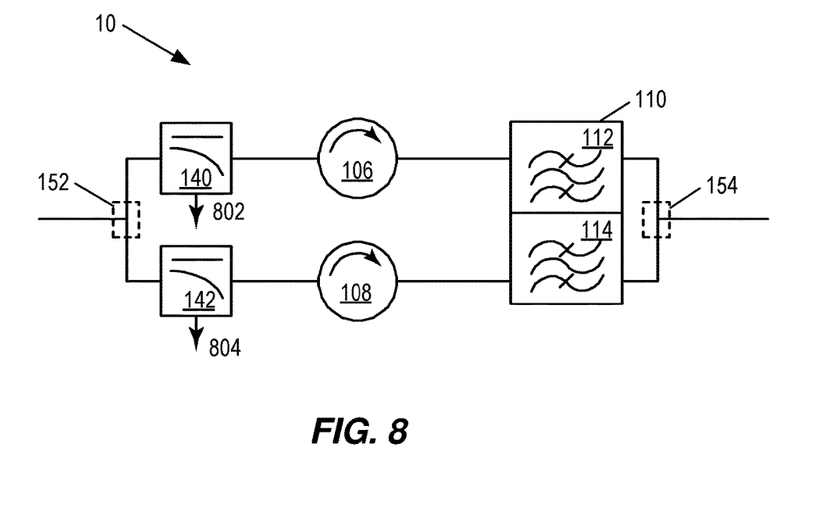
FIG. 8 is diagram of a multi-band transmitter circuit with band-specific couplers for observatory receivers, according to some embodiments.

In a conventional system shown previously in FIG. 3, one single broadband coupler 30 is used to observe the transmitter path in a single path transmitter for multiband. The disadvantage is that the coupling factor will vary the further away the bands are from one another. Harmonic filtering will also be challenging since the bands are so far apart. To address such issues, in some embodiments, such as those shown in FIG. 8, separate transmit observatory receivers 140, 142 are provided for each band. Signals are provided for each band path by a diving node 152, such as a T-junction. The signals are likewise combined using a combining node 154, such as another T-junction. Feedback signals 802, 804 may be sample versions of the corresponding output multi-band signal and are thus provided for observation from directional couplers 140, 142. One advantage is that each path can be optimized and filtered properly before the signal reaches the analog to digital converter or ADC. A switch can be implemented at the ADC to observe each of the bands. An advantage of this is that aliasing is reduced by reducing the amount of spurious signal mixing. This will help the performance of the linearizer to better correct the distortions caused by the power amplifier.

Figure 9:
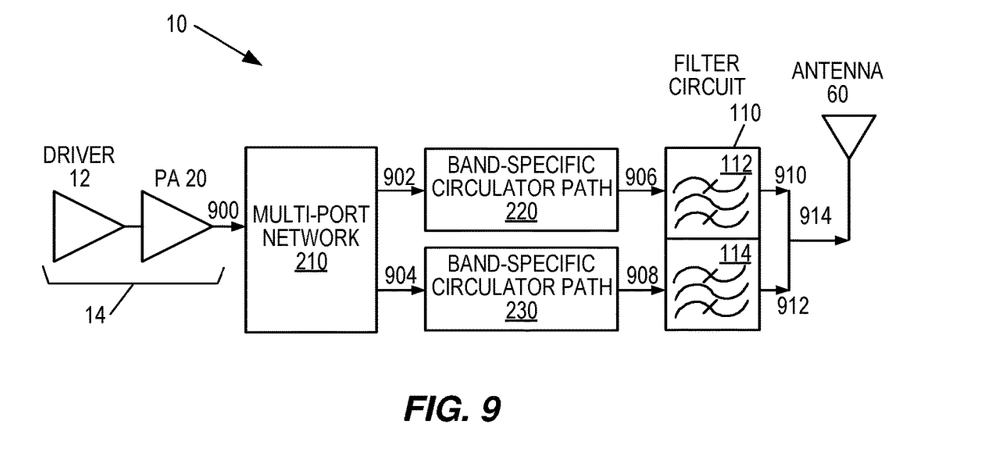
FIG. 9 is a block diagram of a multi-band transmitter circuit, according to some embodiments.

FIG. 9 is a conceptual illustration of the components of a multi-band transmitter circuit 10. The multi-band transmitter circuit 10 includes a multi-port network 210 configured to divide an input multi-band signal 900 comprising signal components at each of a plurality of frequency bands into a plurality of output multi-band signals 902, 904. In some cases, at least two frequency bands of the input multi-band signal 900 are not contiguous. The signal 900 may be an amplified signal received from amplification path 14.

The multi-band transmitter circuit 10 also includes a plurality of band-specific circulator paths 220, 230. Each band-specific circulator path 220, 230 comprises a circulator 106, 108. Each circulator 106, 108 is configured to receive the respective output multi-band signal 902, 904 and operate at a respective one of the frequency bands to provide a respective band-specific signal 906, 908. Each circulator 106, 108 may have a port terminated such that each circulator operates as an isolator. According to some embodiments, the multi-port network 210 is a matching network 102, 104 configured to provide a band-specific impedance match to each circulator 106, 108 in the plurality of band-specific circulator paths 220, 230.

The multi-band transmitter circuit 10 further includes a filter 110 comprising a plurality of band-specific filter elements 112, 114. Each band-specific filter element 112, 114 is coupled to a corresponding circulator 106, 108 and configured to receive the respective band-specific signal 906, 908. Each band-specific filter element 112, 114 operates at the same frequency band as the corresponding circulator 106, 108 to provide a filtered band-specific signal 910, 912 for transmission. Respective band-specific filter elements 112, 114 may be directly coupled and impedance matched to the corresponding circulators 106, 108, without matching to or necessarily matching to an intermediate nominal reference impedance, such as 50 ohms.

The filter 110 may combine the signals 910, 912 to form a combined multi-band signal 914 for transmission an antenna 60. In some cases, the input multi-band signal 900 consists of signal components at two frequency bands and the filter 110 comprises a duplexer circuit.

In some embodiments, the multi-port network 210 comprises a pre-filter element 522, 524 for each of the band-specific circulator paths 220, 230. Each pre-filter element 522, 524 is configured to filter a corresponding one of the output multi-band signals 902, 904 prior to reception by the corresponding circulator 106, 108.

In some embodiments, the multi-band transmitter circuit 10 may include the power amplification circuit 14 that is configured to provide an amplified multi-band signal 900. The multi-port network 210 may be described as being a multi-port matching network 210 having only one input coupled to the power amplification circuit 14 and a plurality of outputs, each output coupled to a separate circulator path 220, 230. The multi-port matching network 210 is configured to divide or distribute the amplified multi-band signal 900 into the separate circulator paths 220, 230. Each circulator 106, 108 is coupled to a respective output of the multi-port matching network 210 in a respective circulator path 220, 230 and configured to isolate a frequency band-specific signal from the amplified multi-band signal 902, 904 distributed to the circulator 106, 108. The multi-port matching network 210 is configured to impedance match the distributed multi-band signals 902, 904 to the corresponding circulators 106, 108. The filter 110 configured to filter and combine the frequency band-specific signals 910, 912 into a combined signal 914 for transmission, such as on antenna 60.

Figure 10:
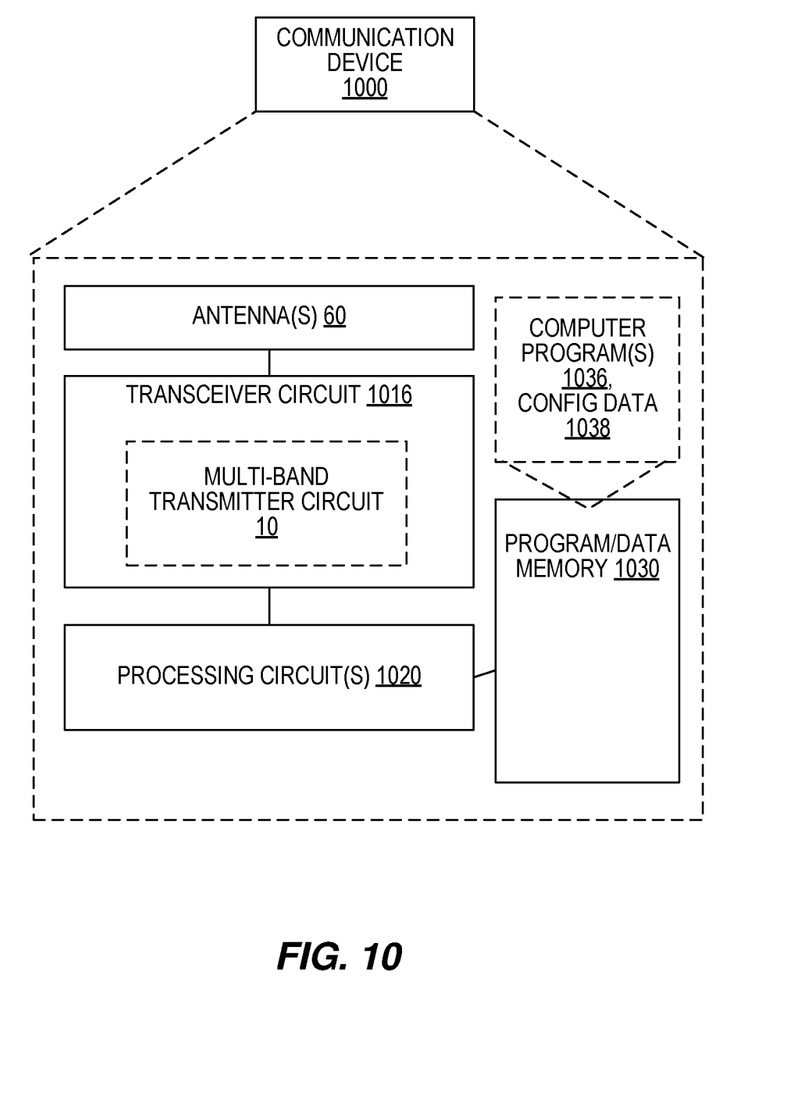
FIG. 10 is a block diagram of a communication device having a multi-band transmitter circuit, according to some embodiments

FIG. 10 illustrates a diagram of a communication device 1000, according to some embodiments. The communication device 1000 may be a radio node, such as a base station, that provides an air interface to wireless devices, e.g., an LTE air interface for downlink transmission and uplink reception, which is implemented via antennas 60 and a transceiver circuit 1016. In some cases, the communication device 1000 is a wireless device. The transceiver circuit 1016 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the IEEE16m (i.e., WiMax) or $3^{rd}$ Generation Partnership Project (3GPP) cellular standards, Global System for Mobile communications (GSM), General Packet Radio Service (GPRS), Wideband Code Division Multiple Access (WCDMA), High-Speed Downlink Packet Access (HSDPA), LTE and LTE-Advanced. The communication device 1000 may also include network interface circuits for communicating with nodes in the core network, other peer radio nodes, and/or other types of nodes in the network.

The communication device 1000 also includes one or more processing circuits 1020 that are operatively associated with the radio transceiver circuit 1016. For ease of discussion, the one or more processing circuits 1020 are referred to hereafter as "the processing circuit 1020". The processing circuit 1020 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 1020 may comprise fixed circuitry, or programmable circuitry that is specially adapted via the execution of program instructions implementing the functionality taught herein, or may comprise some mix of fixed and programmed circuitry. The processing circuit 1020 may be a multi-core based processing circuit having two or more processor cores utilized for enhanced performance, reduced power consumption, and more efficient simultaneous processing of multiple tasks.

The processing circuit 1020 is also associated with memory 1030. The memory 1030, in some embodiments, stores one or more computer programs 1036 and, optionally, configuration data 1038. The memory 1030 provides non-transitory storage for the computer program 1036 and it may comprise one or more types of computer-readable media, such as disk storage, solid-state memory storage, or any mix thereof. By way of non-limiting example, the memory 1030 comprises any one or more of static random-access memory (SRAM), dynamic random-access memory (DRAM), Electrically Erasable Programmable Read-Only Memory (EEPROM), and FLASH memory. In the case of a multi-core processing circuit, a large number of processor cores may share memory 1030.

In general, the memory 1030 comprises one or more types of computer-readable storage media providing non-transitory storage of the computer program and any configuration data used by the communication device 1000. Here, "non-transitory" means permanent, semi-permanent, or at least temporarily persistent storage and encompasses both long-term storage in non-volatile memory and storage in working memory, e.g., for program execution.

The transceiver circuit 1016, in coordination with the processing circuit 1020, at least functionally includes a multi-band transmitter circuit 10, as described above.

Figure 11:
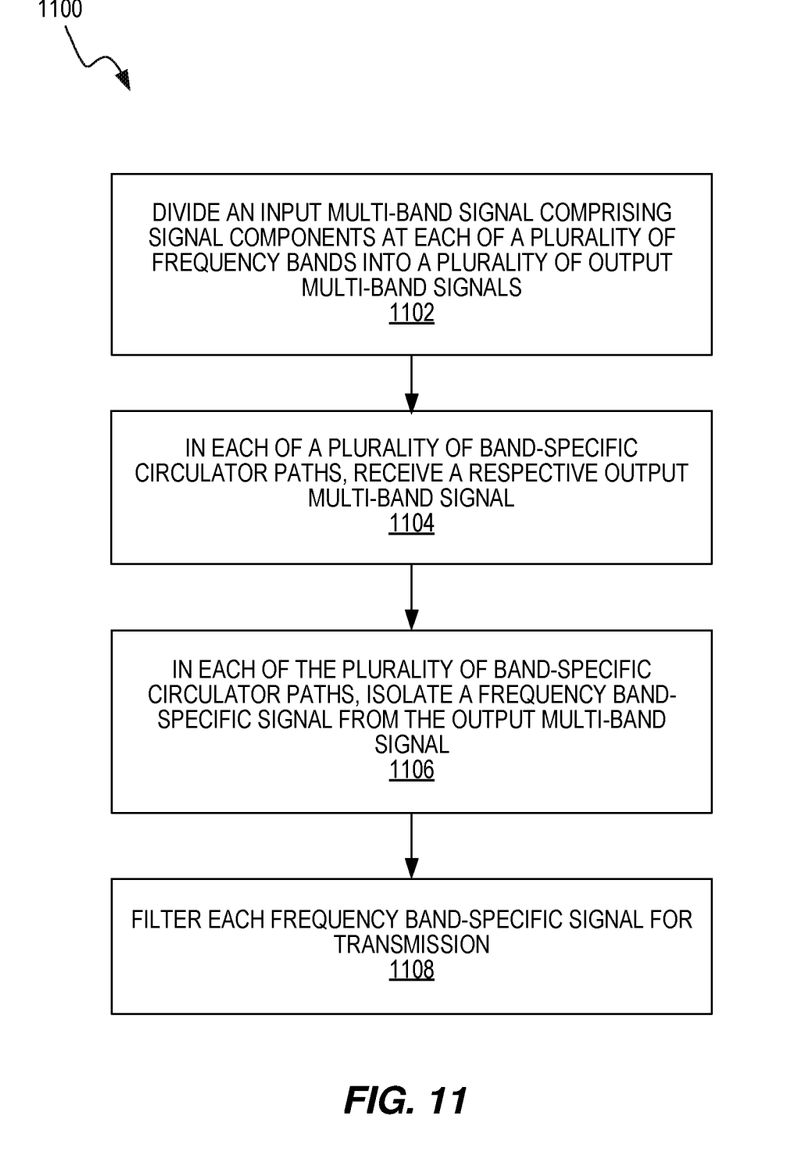
FIG. 11 is a flowchart illustrating a method of transmitting a multi-band signal, according to some embodiments.

Regardless of its specific implementation details, the processing circuit 1020 of communication device 1000 is configured to implement and/or control a multi-band transmitter circuit 10 by performing a method, such as method 1100 of FIG. 11. To that end, the processing circuit 1020 is configured to perform method 1100, including dividing an input multi-band signal comprising signal components at each of a plurality of frequency bands into a plurality of output multi-band signals (block 1102 of FIG. 11). In each of a plurality of band-specific circulator paths, the method 1100 includes receiving a respective output multi-band signal (block 1104) and isolating a frequency band-specific signal from the output multi-band signal (block 1106). The method 1100 also includes filtering each frequency band-specific signal for transmission (block 1108).

Figure 12:
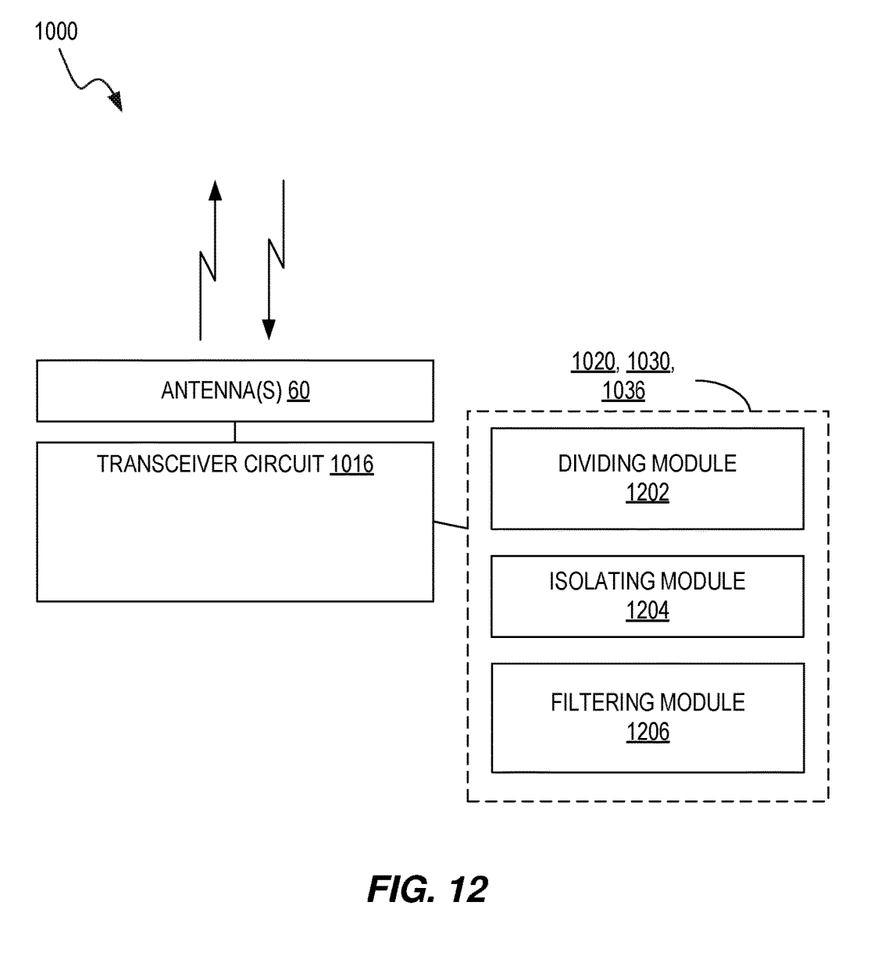
FIG. 12 is a block diagram of a communication device configured to transmit a multi-band signal, according to some embodiments.

FIG. 12 illustrates an example functional module or circuit architecture as may be implemented in the communication device, e.g., based on the processing circuit 1020 executing computer program instructions included in the computer program 1036 stored in the storage memory 1030. The illustrated embodiment at least functionally includes a dividing module 1202 for dividing an input multi-band signal comprising signal components at each of a plurality of frequency bands into a plurality of output multi-band signals. The embodiment also includes an isolating module 1204 for, in each of a plurality of band-specific circulator paths, receiving a respective output multi-band signal and isolating a frequency band-specific signal from the output multi-band signal. The embodiment also includes a filtering module 1206 for filtering each frequency band-specific signal for transmission.

The processing circuit 1020 and memory 1030 are connected to a transceiver circuit 1016, which is associated with the antenna 60. The communication device 1000 may include network interface circuit(s) for exchanging information with other nodes, including other nodes in a core network, such as through an S1 interface.

The described embodiments provide for the combining of any bands for true multiband radio. For example, the multiple circulators and tightly integrated filters of various embodiments may provide, from a single power amplification path, a multi-band signal having bands beyond the normal circulator limitation of 20% fractional bandwidth and without the expected performance loss. In addition, fault detection is more precise due to separate ports (band) vs. broadband. Separate transmit observatory receiver paths may provide for more accurate sample versions. Also, separate harmonic filtering may take place for two separate couplers, which reduces the mixing of spurious signals.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A multi-band transmitter circuit, comprising:
   a multi-port network configured to divide an input multi-band signal comprising signal components at each of a plurality of frequency bands into a plurality of output multi-band signals;
   a plurality of band-specific circulator paths, each band-specific circulator path comprising a circulator configured to receive a respective one of the output multi-band signals and operate at a respective one of the frequency bands to provide a respective band-specific signal; and
   a filter circuit comprising a plurality of band-specific filter elements, each band-specific filter element being coupled to a corresponding circulator and configured to receive the respective band-specific signal and operate at the same frequency band as the corresponding circulator to provide a filtered band-specific signal for transmission;
   wherein the multi-port network comprises a pre-filter element for each of one or more of the band-specific circulator paths, wherein each pre-filter element is configured to filter a corresponding one of the output multi-band signals prior to reception by the corresponding circulator.

2. The multi-band transmitter circuit of claim 1, wherein each of one or more of the circulators comprises a terminated port such that the circulator operates as an isolator.

3. The multi-band transmitter circuit of claim 1, wherein the filter circuit is configured to combine the filtered band-specific signals into a combined multi-band signal for transmission.

4. The multi-band transmitter circuit of claim 1, wherein the input multi-band signal consists of signal components at two frequency bands and wherein the filter circuit comprises a duplexer circuit.

5. The multi-band transmitter circuit of claim 1, wherein at least two frequency bands of the input multi-band signal are not contiguous.

6. The multi-band transmitter circuit of claim 1, wherein the multi-port network comprises a matching network configured to provide a band-specific impedance match to each circulator in the plurality of band-specific circulator paths.

7. The multi-band transmitter circuit of claim 1, further comprising a plurality of directional couplers coupled between the multi-port network and the band-specific circulator paths, wherein each directional coupler being configured to provide a sample version of the corresponding output multi-band signal.

8. The multi-band transmitter circuit of claim 1, wherein each of one or more of the circulators is configured to output a signal received through the filter circuit.

9. A multi-band transmitter circuit, comprising:
   a multi-port network configured to divide an input multi-band signal comprising signal components at each of a plurality of frequency bands into a plurality of output multi-band signals;
   a plurality of band-specific circulator paths, each band-specific circulator path comprising a circulator configured to receive a respective one of the output multi-band signals and operate at a respective one of the frequency bands to provide a respective band-specific signal; and
   a filter circuit comprising a plurality of band-specific filter elements, each band-specific filter element being coupled to a corresponding circulator and configured to receive the respective band-specific signal and operate at the same frequency band as the corresponding circulator to provide a filtered band-specific signal for transmission;
   wherein respective band-specific elements of the filter circuit are directly coupled and impedance matched to the corresponding circulators, without matching to a nominal reference impedance.

10. The multi-band transmitter circuit of claim 9, wherein each of one or more of the circulators comprises a terminated port such that the circulator operates as an isolator.

11. The multi-band transmitter circuit of claim 9, wherein the filter circuit is configured to combine the filtered band-specific signals into a combined multi-band signal for transmission.

12. The multi-band transmitter circuit of claim 9, wherein the input multi-band signal consists of signal components at two frequency bands and wherein the filter circuit comprises a duplexer circuit.

13. The multi-band transmitter circuit of claim 9, wherein at least two frequency bands of the input multi-band signal are not contiguous.

14. The multi-band transmitter circuit of claim 9, wherein the multi-port network comprises a matching network configured to provide a band-specific impedance match to each circulator in the plurality of band-specific circulator paths.

15. The multi-band transmitter circuit of claim 9, further comprising a plurality of directional couplers coupled between the multi-port network and the band-specific circulator paths, wherein each directional coupler being configured to provide a sample version of the corresponding output multi-band signal.

16. A method, in a communication device, of transmitting a multi-band signal, comprising:
   dividing an input multi-band signal comprising signal components at each of a plurality of frequency bands into a plurality of output multi-band signals;
   in each of a plurality of band-specific circulator paths, receiving a respective one of the output multi-band signals and isolating a frequency band-specific signal from the output multi-band signal;
   filtering each frequency band-specific signal for transmission; and
   impedance matching a respective circulator to a corresponding band-specific element of a filter circuit in the respective band-specific circulator path without matching to a nominal reference impedance.

17. The method of claim 16, further comprising amplifying the input multi-band signal using a single power amplification path prior to the dividing.

18. The method of claim 16, further comprising impedance matching a respective output multi-band signal to the corresponding circulator.

19. The method of claim 16, further comprising filtering a corresponding one of the output multi-band signals prior to reception by the corresponding circulator.

20. The method of claim 16, further comprising outputting, from a respective circulator, a signal received through the filter circuit.

* * * * *